US012217889B2

(12) United States Patent
Nakamura et al.

(10) Patent No.: US 12,217,889 B2
(45) Date of Patent: Feb. 4, 2025

(54) GRAIN-ORIENTED ELECTRICAL STEEL SHEET, AND STEEL SHEET SERVING AS BASE SHEET FOR GRAIN-ORIENTED ELECTRICAL STEEL SHEET

(71) Applicant: NIPPON STEEL CORPORATION, Tokyo (JP)

(72) Inventors: Shuichi Nakamura, Tokyo (JP); Yoshiyuki Ushigami, Tokyo (JP); Hiroyasu Fujii, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 28 days.

(21) Appl. No.: 17/422,011

(22) PCT Filed: Jan. 16, 2020

(86) PCT No.: PCT/JP2020/001145
§ 371 (c)(1),
(2) Date: Jul. 9, 2021

(87) PCT Pub. No.: WO2020/149324
PCT Pub. Date: Jul. 23, 2020

(65) Prior Publication Data

US 2022/0102035 A1 Mar. 31, 2022

(30) Foreign Application Priority Data

Jan. 16, 2019 (JP) ................................ 2019-005127

(51) Int. Cl.

| | |
|---|---|
| ***H01F 1/147*** | (2006.01) |
| ***C21D 6/00*** | (2006.01) |
| ***C21D 8/12*** | (2006.01) |
| ***C21D 9/46*** | (2006.01) |
| ***C23C 22/78*** | (2006.01) |

(52) U.S. Cl.
CPC ............. *H01F 1/147* (2013.01); *C21D 6/008* (2013.01); *C21D 8/1233* (2013.01); *C21D 8/1255* (2013.01); *C21D 8/1272* (2013.01); *C21D 8/1288* (2013.01); *C21D 9/46* (2013.01); *C23C 22/78* (2013.01); *C21D 2201/05* (2013.01)

(58) Field of Classification Search
None
See application file for complete search history.

(56) References Cited

U.S. PATENT DOCUMENTS

| | | | | |
|---|---|---|---|---|
| 3,856,568 A | 12/1974 | Tanaka et al. | | |
| 3,932,236 A | 1/1976 | Wada et al. | | |
| 2009/0145526 A1* | 6/2009 | Arai | H01F 1/16 | 148/306 |
| 2012/0171467 A1* | 7/2012 | Takeda | C09D 5/084 | 428/327 |
| 2018/0371573 A1* | 12/2018 | Kwon | B23K 26/40 | |

FOREIGN PATENT DOCUMENTS

| | | | | |
|---|---|---|---|---|
| EP | 0 565 029 A1 | 10/1993 | | |
| EP | 913488 A2 * | 5/1999 | C21D 8/1277 | |
| JP | 48-39338 A | 6/1973 | | |
| JP | 49-96920 A | 9/1974 | | |
| JP | 3-28321 A | 2/1991 | | |
| JP | 5-295491 A | 11/1993 | | |
| JP | 7-54155 A | 2/1995 | | |
| JP | 2671076 B2 | 10/1997 | | |
| JP | 10-46252 A | 2/1998 | | |
| JP | 2007-051314 A | 3/2007 | | |
| JP | 2007-262431 A | 10/2007 | | |
| JP | 2008-31499 A | 2/2008 | | |
| JP | 2014-189832 A | 10/2014 | | |
| JP | 2017-133086 A | 8/2017 | | |
| JP | 2018-62682 A | 4/2018 | | |

OTHER PUBLICATIONS

Inokuti et al., "Influence of Surface Treatment before Coating on Magnetic Properties of TiN-Coated Grain Oriented Silicon Steel Sheet", Journal of the Japan Institute of Metals and Materials, Mar. 31, 1997, vol. 61, No. 3, pp. 235-240.

* cited by examiner

*Primary Examiner* — Kim S. Horger
(74) *Attorney, Agent, or Firm* — Birch, Stewart, Kolasch & Birch, LLP

(57) ABSTRACT

A grain-oriented electrical steel sheet according to an aspect of the present invention includes an underlying steel sheet and a tension-insulation coating arranged on the surface of the underlying steel sheet, and a ten-point average roughness RzL in an L direction obtained when the tension-insulation coating is removed from the grain-oriented electrical steel sheet with an alkaline solution, and then the surface of the underlying steel sheet is measured in a rolling direction is 6.0 μm or less.

15 Claims, No Drawings

GRAIN-ORIENTED ELECTRICAL STEEL SHEET, AND STEEL SHEET SERVING AS BASE SHEET FOR GRAIN-ORIENTED ELECTRICAL STEEL SHEET

TECHNICAL FIELD

The present invention relates to a gain-oriented electrical steel sheet, and a steel sheet serving as a base sheet for a grain-oriented electrical steel sheet.

Priority is claimed on Japanese Patent Application No. 2019-5127, filed Jan. 16, 2019, the content of which is incorporated herein by reference.

BACKGROUND ART

Generally, grain-oriented electrical steel sheets are used as iron cores for transformers and the like, and since the magnetic characteristics of the grain-oriented electrical steel sheets have a large influence on the performance of the transformers, various research and development has been conducted to improve the magnetic characteristics thereof. As a method of reducing the iron loss of a grain-oriented electrical steel sheet, for example, Patent Document 1 below discloses a technology in which a solution containing colloidal silica and phosphate as main components is applied to a surface of a steel sheet after final annealing, baking is performed to form a tension-applying coating, and the iron loss is reduced. In addition, Patent Document 2 below discloses a technology in which the average roughness Ra of the surface of a material after final annealing is set to 0.4 μm or less, a laser beam is emitted to the surface, local strain is applied to a steel sheet, a magnetic domain is subdivided, and the iron loss is reduced. According to these technologies shown in Patent Document 1 and Patent Document 2 below, the iron loss has become very favorable.

Incidentally, in recent years, the demands for reducing the size of transformers and increasing the performance thereof have been increasing, and in order to reduce the size of transformers, it is required for grain-oriented electrical steel sheets to have favorable iron loss even if a magnetic flux density is high. As a method of improving the iron loss, research is being conducted on eliminating an inorganic coating present on general grain-oriented electrical steel sheets, and also applying tension. Since a tension-applying coating is formed later, an inorganic coating may be referred to as a primary coating, and an insulation coating to which tension is applied may be referred to as a secondary coating.

On a surface of a grain-oriented electrical steel sheet, an oxide layer containing silica as a main component produced in a decarburization annealing process reacts with magnesium oxide applied to the surface in order to prevent baking during final annealing to form an inorganic coating containing forsterite as a main component. The inorganic coating has a slight tension effect and has an effect of improving the iron loss of the grain-oriented electrical steel sheet. However, as a result of research so far, it has become clear that the inorganic coating has an adverse effect on the magnetic characteristics because it is a non-magnetic layer. Therefore, a technology in which an inorganic coating is removed using a mechanical method such as polishing or a chemical method such as pickling or formation of an inorganic coating is prevented during high-temperature final annealing, and thus a grain-oriented electrical steel sheet having no inorganic coating or the surface of a steel sheet is mirror-finished is being researched.

As a technology for preventing formation of such an inorganic coating or smoothing the surface of a steel sheet, for example, Patent Document 3 below discloses a technology in which pickling is performed to remove surface formations after general final annealing, and the surface of the steel sheet is then mirror-finished by chemical polishing or electrolytic polishing. In addition, in recent years, for example, as disclosed in Patent Document 4 below, there has come to be a technology in which bismuth or a bismuth compound is added to an annealing separator used during final annealing to prevent formation of an inorganic coating.

It is found that, when a tension-applying coating is applied to the surface of a grain-oriented electrical steel sheet having no inorganic coating or having excellent magnetic smoothness obtained by such a known method, a superior iron loss improving effect is obtained.

However, when the above technologies are used alone, it is not possible to fully satisfy the recent demand for higher performance in grain-oriented electrical steel sheets.

In addition, as a technology for improving characteristics by controlling a surface roughness Ra, Patent Document 5 discloses a grain-oriented electrical steel sheet in which a tension-applying insulation coating is provided on the surface of a grain-oriented electrical steel sheet, a part or all of the surface of the grain-oriented electrical steel sheet has no inorganic coating, the surface of the grain-oriented electrical steel sheet on a side on which the tension-applying insulation coating is provided has a rectangular microstructure, the area ratio, which is a ratio of the area of the microstructures to the surface of the grain-oriented electrical steel sheet is 50% or more, the surface roughness in the rolling direction is 0.10 to 0.35 μm (arithmetic average roughness Ra), and the surface roughness in the perpendicular direction which is a direction perpendicular to a rolling direction is 0.15 to 0.45 μm (arithmetic average roughness Ra).

In Patent Document 6, in a method of producing a grain-oriented electrical steel sheet in which a silicon steel slab is hot-rolled and annealed, and then cold-rolled once or two or more times with intermediate annealing therebetween to obtain a final sheet thickness, this material is subjected to decarburization annealing, an annealing separator is applied, final finishing annealing is performed, an insulation coating agent is then applied, and heat flattening is performed, a method of forming an insulation coating of a grain-oriented electrical steel sheet having favorable lubricity of a surface coating and excellent processability of a wound iron core in which the surface of a steel sheet (strip) is processed before the insulation coating agent is applied, the steel sheet surface roughness (Ra value) is 0.25 to 0.70 μm, and a ratio between a surface roughness LRa in a rolling direction of the strip and a surface roughness CRa in a direction orthogonal to the rolling direction is LRa/CRa≥0.7 is disclosed.

Patent Document 7 discloses an electrical steel sheet for a laminated iron core having excellent high-speed punching properties in which an a 3D surface roughness of a base iron surface is 0.5 μm or less (center-surface average roughness SRa), a power spectrum sum in a wavelength range of 2,730 to 1,024 μm according to frequency analysis is 0.04 $\mu m^2$ or more, and an organic resin-based insulation coating is provided on the surface.

CITATION LIST

Patent Document

[Patent Document 1]
Japanese Unexamined Patent Application, First Publication No. S48-39338
[Patent Document 2]
Japanese Patent No. 2671076
[Patent Document 3]
Japanese Unexamined Patent Application, First Publication No. S49-96920
[Patent Document 4]
Japanese Unexamined Patent Application, First Publication No. H7-54155
[Patent Document 5]
Japanese Unexamined Patent Application, First Publication No. 2018-62682
[Patent Document 6]
Japanese Unexamined Patent Application, First Publication No. H3-28321
[Patent Document 7]
Japanese Unexamined Patent Application, First Publication No. 115-295491

SUMMARY OF THE INVENTION

Problems to be Solved by the Invention

It is found that, even when the arithmetic average roughness Ra of an underlying steel sheet is controlled and a B-W characteristic (balance between B and W) is improved according to these technologies, the magnetic flux density is low and a favorable low iron loss effect is not obtained. The results of extensive studies on a technology for avoiding this decrease in the magnetic flux density were that when the roughness in the L direction is controlled, decrease in the magnetic flux density is minimized while a favorable B-W balance is maintained, and a favorable iron loss improving effect is successfully obtained.

The present invention has been made in view of the above problems and findings, and an object of the present invention is to provide a grain-oriented electrical steel sheet having an excellent B-W characteristic and favorable iron loss characteristics and a steel sheet serving as a base sheet thereof.

Means for Solving the Problem

The scope of the present invention is as follows.

(1) A grain-oriented electrical steel sheet according to an aspect of the present invention includes an underlying steel sheet and a tension-insulation coating arranged on the surface of the underlying steel sheet, and the underlying steel sheet obtained by removing the tension-insulation coating from the grain-oriented electrical steel sheet with an alkaline solution has a ten-point average roughness RzL in a rolling direction of 6.0 μm or less.

(2) In the grain-oriented electrical steel sheet according to (1), the underlying steel sheet obtained by removing the tension-insulation coating from the grain-oriented electrical steel sheet with an alkaline solution has a ten-point average roughness RzC in a direction perpendicular to the rolling direction of 8.0 μm or less.

(3) In the grain-oriented electrical steel sheet according to (1) or (2), the ten-point average roughness RzL in the rolling direction and the ten-point average roughness RzC in the direction perpendicular to the rolling direction satisfy RzL/RzC<1.0.

(4) In the grain-oriented electrical steel sheet according to any one of (1) to (3), an arithmetic average roughness RaL in the rolling direction is less than 0.4 μm.

(5) In the grain-oriented electrical steel sheet according to any one of (1) to (4), an arithmetic average roughness RaC in the direction perpendicular to the rolling direction is less than 0.6 μm.

(6) A steel sheet according to another aspect of the present invention is a steel sheet serving as a base sheet of the grain-oriented electrical steel sheet according to any one of (1) to (5), wherein a ten-point average roughness RzL in the rolling direction is 6.0 μm or less.

(7) In the steel sheet according to (6), a ten-point average roughness RzC in a direction perpendicular to the rolling direction is 8.0 μm or less.

(8) In the steel sheet according to (6) or (7), the ten-point average roughness RzL in the rolling direction and the ten-point average roughness RzC in the direction perpendicular to the rolling direction satisfy RzL/RzC<1.0.

(9) In the steel sheet according to any one of (6) to (8), an arithmetic average roughness RaL in the rolling direction is less than 0.4 μm.

(10) In the steel sheet according to any one of (6) to (9), an arithmetic average roughness RaC in the direction perpendicular to the rolling direction is less than 0.6 μm.

Effects of the Invention

According to the present invention, it is possible to provide a grain-oriented electrical steel sheet having an excellent B-W characteristic and excellent iron loss characteristics and a base sheet (steel sheet) as a material thereof.

EMBODIMENT(S) FOR IMPLEMENTING THE INVENTION

Hereinafter, preferable embodiments of the present invention will be described in detail.

(Grain-Oriented Electrical Steel Sheet)

A grain-oriented electrical steel sheet according to the present embodiment includes an underlying steel sheet and a tension-insulation coating arranged on a surface of the underlying steel sheet. Generally, the underlying steel sheet constituting the grain-oriented electrical steel sheet contains silicon as a steel component. Since this silicon element is very easily oxidized, an oxide coating containing the silicon element is formed on the surface of the underlying steel sheet after decarburization annealing performed in the process of producing a grain-oriented electrical steel sheet. In a general process of producing a grain-oriented electrical steel sheet, after decarburization annealing, an annealing separator is applied to a surface of a underlying steel sheet, the underlying steel sheet is then coiled into a coil, and final annealing is performed thereon. Here, when an annealing separator containing MgO as a main component is applied to the underlying steel sheet, MgO reacts with the oxide coating on the surface of the underlying steel sheet during final annealing, and an inorganic coating containing forsterite as a main component is formed on the surface of the underlying steel sheet. However, the inventors found that the iron loss reducing effect is strong when an inorganic coating such as forsterite is prevented from being present on the surface of the grain-oriented electrical steel sheet in order to realize an excellent high magnetic field iron loss.

Then, the inventors conducted extensive research. As a result, the inventors found that, when the surface roughness of the underlying steel sheet, particularly, a ten-point average roughness, is appropriately controlled, it is possible to further improve the magnetic characteristics. Specifically, when the above treatment (mirror finishing) is performed so that the inorganic coating is not present on the surface of the grain-oriented electrical steel sheet, iron loss characteristics at the same magnetic flux density B8 become favorable (this state is referred to as "a favorable B-W characteristic"), and in addition to this, the inventors found that, when the ten-point average roughness is controlled so that predetermined conditions are satisfied, the magnetic flux density B8 can be further improved while maintaining a favorable B-W characteristic, and iron loss characteristics can be improved. The present invention is completed based on such findings.

Here, the ten-point average roughness (ten point height of roughness profile) in the present embodiment is not based on the definition in JIS B 0601:2013, but is a value (RzJIS94) measured based on "a sum of an average of the 5th mountain height from the highest mountain peak in descending order and an average of the 5th valley depth from the deepest valley trough in ascending order on a contour curve (old standard JIS B 0601: roughness curve of 1994) of a reference length obtained by applying (a phase compensation low pass filter with a cutoff value λs is not applied) a phase compensation high pass filter with a cutoff value λc" in the definition of old standard JIS B 0660: 1998. In the present embodiment, the arithmetic average roughness (arithmetic average roughness) Ra is also examined, but this definition is the same as that expressed by "the following arithmetic average height obtained using the roughness curve (75%) in the definition of the center line average roughness Ra75 of old standard JIS B 0660: 1998, as $$Ra_{75} = \frac{1}{\ln}\int_0^{ln} |Z(x)|dx \qquad \text{[Math. 1]}$$

Here, Z(x): roughness curve (75%) In: evaluation length".

Both the ten-point average roughness Rz and the arithmetic average roughness Ra may be abbreviated simply as "surface roughness". In the present embodiment, the term "surface roughness" may refer to a concept that includes the ten-point average roughness Rz and the arithmetic average roughness Ra. However, the ten-point average roughness Rz and the arithmetic average roughness Ra are parameters to be distinguished. The inventors first examined the relationship between the arithmetic average roughness Ra and the iron loss, but eventually came to clearly understand that the variation in the iron loss cannot be explained only with the arithmetic average roughness Ra. In the evaluation results of underlying steel sheets prepared in various conditions by the inventors, a phenomenon in which the iron loss varies in the grain-oriented electrical steel sheets obtained using the underlying steel sheets having substantially the same arithmetic average roughness Ra was confirmed. Therefore, as a result of further examination by the inventors, it can be clearly understood that the above variation in the iron loss can be explained by the ten-point average roughness RzL in the rolling direction and the ten-point average roughness RzC in the direction perpendicular to the rolling direction of the underlying steel sheet. The things to be focused on here are that the surface roughness of the underlying steel sheet should be evaluated by the ten-point average roughness Rz and the relationship between the roughness in the rolling direction and the roughness in the direction perpendicular to the rolling direction of the underlying steel sheet should be focused on.

In the following description, the ten-point average roughness will be described as "Rz", the ten-point average roughness in the rolling direction will be described as "RzL", the ten-point average roughness in the direction perpendicular to the rolling direction will be described as "RzC", the arithmetic average roughness will be described as "Ra", the arithmetic average roughness in the rolling direction will be described as "RaL", and the arithmetic average roughness in the direction perpendicular to the rolling direction will be described as "RaC".

The magnitude of Rz and the magnitude of Ra do not always show the same tendency. For example, in various grain-oriented electrical steel sheets in which the RaL of the underlying steel sheet is about 0.20 μm, the RzL of the underlying steel sheet may vary. Thus, in these grain-oriented electrical steel sheets, the magnitude of the iron loss occurs depending on the magnitude of RzL of the underlying steel sheet.

As clearly understood from the above definition, Ra indicates the average value of the roughness curve, and here, the mountain height and the valley depth in the roughness curve are not reflected. However, the inventors speculate that the valley depth in the roughness curve of the underlying steel sheet influences the iron loss. On the surface of the underlying steel sheet, valleys of the roughness curve may occur at crystal grain boundaries, non-uniform surface oxidation parts, and locations corresponding to uneven distribution of lattice defects such as segregation and dislocation of contained elements. The valley of the roughness curve is a location in which the steel sheet, which is a magnetic substance, is divided, and is a void when the surface of the steel sheet is exposed, and if the surface of the steel sheet is covered with a tension-insulation coating or the like, the tension-insulation coating, which is a non-magnetic substance, enters the valley of the roughness curve. Thus, the valley part of the roughness curve in which Fe, which is a magnetic substance, is divided hinders the passage of magnetic flux in the surface area of the steel sheet when the steel sheet is magnetized. That is, when the magnetic flux near the surface of the underlying steel sheet passes through the valley part that is a void or the valley part filled with a non-magnetic substance, it is considered that the magnetic flux density of the steel sheet decreases and the iron loss increases due to resistance.

Such an influence can be recognized, focusing on a relatively deep valley part, and with a numerical value such as Ra, characteristic changes due to such an influence are buried in the variation, and are not recognized as a configuration to be controlled (in the following description, the above "valley (part) of the roughness curve on the surface of the steel sheet" may be simply referred to as "valley (part)"). For this reason, the inventors consider that the variation in the iron loss can be explained with the ten-point average roughness Rz calculated based on the mountain height and the valley depth.

Generally, the arithmetic average roughness RaL measured in the rolling direction, that is, the L direction, is smaller than the arithmetic average roughness RaC measured in the C direction. In the related art, there is an example focusing on the relationship between the arithmetic average roughness and the iron loss, but here, only the magnitude of the arithmetic average roughness Ra is focused on, and therefore, the arithmetic average roughness RaC in the C direction is considered to be more important. Specifically, when the value of RaC is reduced, the W17/50 value of the steel sheet having the same magnetic flux density B8 can be reduced (a favorable B-W characteristic is obtained).

However, the inventors examined the relationship between the surface roughness and the iron loss focusing on ten-point average roughness Rz and as a result, found that, even if the W17/50 value in the same B8 is the same, a favorable B8 itself cannot be obtained, but actually a favorable correlation is observed between the ten-point average roughness RzL in the L direction and the iron loss. Therefore, in the grain-oriented electrical steel sheet according to the present embodiment, the ten-point average roughness RzL in the L direction of the underlying steel sheet is controlled to be 6.0 μm or less.

Here, in the grain-oriented electrical steel sheet according to the present embodiment, as a result of examining the influence of the RzC of the underlying steel sheet (valley detected in the measurement of the ten-point average roughness in the C direction), the ten-point average roughness RzC in the C direction is preferably larger than the ten-point average roughness RzL in the L direction. However, if the RzC is too large, the adverse effect of the valley detected in the measurement of the ten-point average roughness in the C direction becomes significant, and the ten-point average roughness RzL in the L direction may also become coarse.

Therefore, in order to obtain the above effects, the upper limit value of the ten-point average roughness RzC in the C direction is desirably 8.0 μm or less.

In addition, it is found that, when the RzC is controlled to be 8.0 μm or less, it is more preferable that RzL/RzC, which is a ratio of the ten-point average roughness RzL in the L direction to the ten-point average roughness RzC in the C direction, be less than 1.0. That is, it is more preferable that the relationship of $RzL/RzC<1.0$ be satisfied. This is because, when the ten-point average roughness RzC in the C direction is larger than the ten-point average roughness RzL in the L direction, it is estimated that the shape of the valley (valley in the C direction) detected in the measurement of the ten-point average roughness in the L direction is irregular. It is considered that, due to the irregular shape of the valley, the magnetic flux moves smoothly, the adverse effect of the valley detected in the measurement of the ten-point average roughness in the L direction is alleviated, and further improvement in the iron loss characteristics can be achieved.

Here, $RzL/RzC<0.9$ or $RzL/RzC<0.7$ is more preferable.

It can be intuitively understood that a smaller Rz, which is an index of hindrance of passage of the magnetic flux is preferable in order to improve the magnetic characteristics, but the reason why a larger RzC provides better magnetic characteristics is not clear. Currently, the inventors speculate as follows.

It is considered that valley parts evaluated by RzL and RzC morphologically extend in the direction perpendicular to the respective measurement directions. For example, it is considered that the valley part measured in the rolling direction evaluated by RzL is measured as a linear (or streaky) recess that extends in the direction perpendicular to the rolling direction. In addition, it is considered that the valley part measured in the direction perpendicular to the rolling direction evaluated by RzC is measured as a linear (or streaky) recess that extends in the rolling direction.

In this situation, when viewed from the magnetic flux that passes in the rolling direction, the valley part evaluated by RzL becomes an area that is blocked like a wall in the passing direction. This is convenient for understanding a qualitative feature that the magnetic characteristics deteriorate as the RzL increases. On the other hand, the valley part evaluated by RzC becomes an area that follows the magnetic flux that passes in the rolling direction like a wall. Such an area is considered to have an effect of preventing the magnetic flux from deviating from the rolling direction, and it is convenient to understand a qualitative feature that the magnetic characteristics are improved as the RzC increases.

In the above, the possibility of understanding the influence of the valley part due to the RzC in consideration of passage of the magnetic flux has been shown, but it is also possible to understand the mechanism of the present invention in consideration of the electrical resistance. When the magnetic flux passes in the rolling direction, a basic phenomenon of electromagnetism is that a current flows in the direction perpendicular to this, that is, in the direction perpendicular to the rolling direction along the surface of the steel sheet. This current is called an eddy current in the electrical steel sheet, and contributes to the iron loss. Generally, when an element such as Si is added at a high concentration to the steel sheet, the electrical resistance is increased, and generation of the eddy current is prevented, the iron loss is minimized.

The valley part that extends in the rolling direction on the surface of the steel sheet evaluated by RzC that is controlled in the present invention is a divided area of Fe, which is a conductive substance, and serves as a resistance to the generation of this eddy current, and it is considered that this contributes to improvement of the magnetic characteristics, particularly, decrease in the iron loss.

Although the above mechanism has not been completely elucidated, a phenomenon of "improvement of the magnetic characteristics by increasing the roughness in the direction perpendicular to the rolling direction" in the present invention is a new perspective, and future elucidation of the mechanism is expected.

In addition, in the grain-oriented electrical steel sheet according to the present embodiment, it is preferable that the arithmetic average roughness RaL in the L direction and the arithmetic average roughness RaC in the C direction of the underlying steel sheet be small. In the present embodiment, the valley of the roughness curve on the surface of the underlying steel sheet is most focused on, but since the average value of the roughness curve also influences the iron loss to some extent, it is preferable to specify this as well. Preferably, the RaL is less than 0.4 μm, and the RaC is less than 0.6 μm.

Here, the grain-oriented electrical steel sheet according to the embodiment of the present invention is a grain-oriented electrical steel sheet including an underlying steel sheet and a tension-insulation coating arranged on the surface of the underlying steel sheet.

<Underlying Steel Sheet>

In the grain-oriented electrical steel sheet according to in the present embodiment, the underlying steel sheet used as the base steel sheet of the tension-insulation coating is not particularly limited. For example, a grain-oriented electrical steel sheet made of a known steel component can be used as an underlying steel sheet. Examples of such a grain-oriented electrical steel sheet include a grain-oriented electrical steel sheet containing at least 2 to 7 mass % of Si. When the concentration of Si in the steel component is set to 2% or more, it is possible to realize desired magnetic characteristics. On the other hand, when the concentration of Si in the steel component is more than 7%, since the brittleness of the underlying steel sheet is low, and production becomes difficult, the concentration of Si in the steel component is preferably 7% or less.

In the grain-oriented electrical steel sheet according to in the present embodiment, a glass film (forsterite coating) may or may not be provided between the underlying steel sheet and the tension-insulation coating. When there is no glass film between the underlying steel sheet and the tension-insulation coating, further improvement in the iron loss characteristics of the grain-oriented electrical steel sheet can be achieved. Here, the grain-oriented electrical steel sheet having no glass film can be referred to as a grain-oriented electrical steel sheet in which a tension-insulation coating is arranged directly above the steel sheet or a grain-oriented electrical steel sheet in which the underlying steel sheet is a glassless steel sheet. On the other hand, when a glass film is formed between the underlying steel sheet and the tension-insulation coating, the adhesion of the tension-insulation coating can be improved.

The Rz and Ra of the surface of the underlying steel sheet are measured after the tension-insulation coating formed on the surface of the grain-oriented electrical steel sheet is removed with an alkaline solution or the like. The tension-insulation coating is removed by the following procedure. First, 48% caustic soda (sodium hydroxide aqueous solution, specific gravity 1.5) and water are mixed at a volume ratio of 6:4 to prepare a 33% caustic soda aqueous solution (sodium hydroxide aqueous solution). The temperature of the 33% caustic soda aqueous solution is set to 85° C. or higher. Then, the grain-oriented electrical steel sheet with an insulation coating is immersed in the caustic soda aqueous solution for 20 minutes. Then, the grain-oriented electrical steel sheet is washed with water and dried, and thus the insulation coating of the grain-oriented electrical steel sheet can be removed. In addition, this immersion, washing with water, and drying operation are repeated depending on the thickness of the insulation coating, and the insulation coating is removed.

The Rz and Ra can be measured by a known method according to JIS B 0660: 1998. In the present invention, the Rz and Ra are measured at 5 locations on the surface of the underlying steel sheet in the rolling direction and the direction perpendicular to the rolling direction. The average values of the obtained plurality of measured values are set as the RzL and RzC, and RaL and RaC of the underlying steel sheet of the grain-oriented electrical steel sheet of interest.

(Method of Producing Grain-Oriented Electrical Steel Sheet)

Next, a method of producing a grain-oriented electrical steel sheet according to the present embodiment will be described in detail. According to the production method described below, a grain-oriented electrical steel sheet according to the present embodiment can be suitably obtained. However, it is needless to say that the grain-oriented electrical steel sheet obtained by a method different from the production method described below corresponds to the grain-oriented electrical steel sheet according to the present embodiment as long as it satisfies the above requirements.

In the method of producing a grain-oriented electrical steel sheet according to the present embodiment, first, an underlying steel sheet of a grain-oriented electrical steel sheet is produced by a general method. Conditions for producing the underlying steel sheet are not particularly limited, and general conditions can be used. For example, casting, hot rolling, hot-band annealing, cold rolling, decarburization annealing, annealing separator application, and final annealing are performed using a molten steel having a chemical component suitable for the grain-oriented electrical steel sheet as a raw material, and thus an underlying steel sheet can be obtained.

<Tension-Insulation Coating>

The grain-oriented electrical steel sheet has a tension-applying coating (tension-insulation coating) formed on the underlying steel sheet. Here, an oxide layer with a slight thickness may be formed on the surface of the underlying steel sheet. The tension-applying coating is not particularly limited, and those used as the tension-applying coating of the conventional grain-oriented electrical steel sheet can be applied. Examples of such a tension-applying coating include a coating containing phosphate or colloidal silica or combination thereof as a main component.

The amount of the tension-applying coating adhered is not particularly limited, but the adhesion amount is preferably set so that a high tension of generally 0.4 kgf/mm$^2$ or more or more preferably 0.8 kgf/mm$^2$ or more can be realized. The amount of the tension-applying coating applied according to the present embodiment is, for example, about 2.0 g/m$^2$ to 7.0 g/m$^2$.

(Control of Surface Roughness of Underlying Steel Sheet)

The grain-oriented electrical steel sheet according to the present embodiment described above has a specific surface roughness described above and thus the iron loss can be kept very low.

The method of controlling Ra is not particularly limited, and a known method may be appropriately used. For example, when the roll roughnesses of a hot-rolled steel sheet and a cold-rolled steel sheet are appropriately controlled or the surface of the underlying steel sheet is ground, it is possible to control the Ra of the underlying steel sheet.

As for the Rz, a known method can be appropriately used, but an example of a method of obtaining an appropriate shape (a depth, also a width, an extension length, etc.) in the present invention will be described below.

Here, particularly, a control method using a surface reaction of a steel sheet will be described. The basic control guideline is to form an appropriate non-uniform area in structure control of crystal grain boundaries in a heat treatment procedure, element segregation, surface oxidation, or the like, and to apply a surface treatment such as pickling thereto and control a surface form. As an example, an example of performing surface control in final annealing and a powder removal pickling treatment after final annealing is completed is shown.

Since the Rz is obtained as a result of various surface reactions in the steel sheet producing process, it is difficult to unconditionally determine production conditions for obtaining a desired Rz. However, if it is shown in the above basic control guideline, and the following specific examples, with reference thereto, it will not be difficult for a person skilled in the art who adjusts the surface roughness of products by performing a heat treatment, pickling and a surface treatment on a daily basis to finally obtain a desired Rz while observing the surface condition of the actually produced steel sheet.

<Final Annealing>

Factors that control a surface reaction in the final annealing process include the amount of magnesia added to the annealing separator, a partial pressure of nitrogen in the annealing atmosphere, and the like. When an annealing separator composed of alumina and magnesia is used, the amount of magnesia added to the annealing separator is preferably set so that the amount of magnesia added is 10 to 50 mass % with respect to alumina, although it depends on other conditions. In this range and in the vicinity area, the Rz tends to increase as the amount of magnesia added approaches an upper limit region or a lower limit region. It is considered that this is because the local reaction between magnesia and Si in the steel and the resulting condition of diffusion and movement of Si from the inside of the steel sheet and to the surface of the steel sheet change depending on the amount of magnesia added.

However, the surface roughness is also influenced by BAF atmosphere conditions and pickling conditions to be described below. Even if the amount (mass %) of magnesia added with respect to alumina is more than 50%, it is possible to achieve a preferable surface roughness by optimizing BAF atmosphere conditions and pickling conditions.

Regarding the partial pressure of nitrogen in the annealing atmosphere (BAF atmosphere), when the atmosphere is a mixed gas containing nitrogen and hydrogen, the oxidation degree increases as the partial pressure of nitrogen increases. Thereby, oxidation of the steel sheet occurs mainly on the surface of the steel sheet and it is possible to perform control so that the Rz after the powder removal pickling treatment decreases. On the other hand, it is considered that, when the partial pressure of nitrogen is low, oxidation also occurs inside the steel sheet, and the Rz after the powder removal pickling treatment increases. Although it depends on other conditions, basically, the partial pressure of nitrogen has a larger influence particularly on the RzL than the RzC.

<Powder Removal Pickling Treatment after Final Annealing is Completed>

The underlying steel sheet after final annealing is completed is subjected to powder removal pickling. Powder removal is performed by washing with water while rubbing the underlying steel sheet with a brush. The Rz can be controlled by controlling the pressing pressure of the brush and the like in this case in consideration of the surface state of the underlying steel sheet when final annealing is completed (the residual state of the annealing separator, and the state in which an oxide formed on the surface of the steel sheet is removed during final annealing). The cleaning liquid for washing with water may be general industrial water. Although it depends on other conditions, basically, powder removal conditions have a larger influence particularly on the RzC than the RzL.

Next, pickling is performed on the underlying steel sheet after powder removal is completed. The pickling should be performed before a cleaning liquid adhered to the underlying steel sheet is dried by washing with water. In addition, the pickling is preferably performed using sulfuric acid with an acid concentration of 3% or less at a temperature of 90° C. or lower for 1 to 60 seconds. The pickling time is preferably 45 seconds or shorter. When the acid concentration, the pickling temperature, and the pickling time are combined as described above, the ten-point average roughness RzL in the L direction can be within a predetermined range in many cases.

However, the surface roughness is also influenced by the amount of magnesia added and BAF atmosphere conditions described above. Even if the pickling time exceeds 60 seconds, it is possible to achieve a preferable surface roughness by optimizing the BAF atmosphere conditions and pickling conditions. On the other hand, even within the above pickling condition ranges, when conditions for increasing the surface roughness are combined, a favorable surface state may not be obtained.

(Base Sheet)

Next, a steel sheet (hereinafter abbreviated as a "base sheet") serving as a base sheet of a grain-oriented electrical steel sheet according to another embodiment of the present invention will be described below. When a tension-insulation coating is formed on the surface of the base sheet of the grain-oriented electrical steel sheet according to the present embodiment, the above grain-oriented electrical steel sheet according to the present embodiment can be obtained. That is, the base sheet according to the present embodiment is substantially the same as the underlying steel sheet of the grain-oriented electrical steel sheet according to the present embodiment, and the ten-point average roughness RzL in the L direction obtained by measuring the surface of the base sheet in the rolling direction is 6.0 μm or less.

In the steel sheet, the ten-point average roughness RzC in the direction perpendicular to the rolling direction (μm) may be 8.0 μm or less, and in the steel sheet, the value of RzL/RzC may be less than 1.0. In the steel sheet, the arithmetic average roughness RaL in the rolling direction may be less than 0.4 μm. In the steel sheet, the arithmetic average roughness RaC in the direction perpendicular to the rolling direction may be less than 0.6 μm.

The technical effects related to these feature points are the same as the technical effects related to the feature points of the underlying steel sheet of the grain-oriented electrical steel sheet according to the present embodiment. The base sheet according to the present embodiment exhibits extremely excellent iron loss when the tension-insulation coating is formed on the surface thereof.

EXAMPLES

Next, a grain-oriented electrical steel sheet and a method of forming a tension-insulation coating on a grain-oriented electrical steel sheet according to the present invention will be described in detail with reference to examples and comparative examples. Here, the following examples are only examples of the grain-oriented electrical steel sheet and the method of forming a tension-insulation coating on a grain-oriented electrical steel sheet according to the present invention, and the grain-oriented electrical steel sheet and the method of forming a tension-insulation coating on a grain-oriented electrical steel sheet according to the present invention are not limited to the following examples.

Example 1

Decarburization annealing was performed on a cold-rolled steel sheet for producing a grain-oriented electrical steel sheet having a sheet thickness of 0.23 mm and containing 3.2 mass % of Si, and an aqueous slurry of an annealing separator containing components shown in Table 1 was applied to the surface of the decarburized and annealed steel sheet, and dried, and the sheet was then coiled into a coil. Next, the decarburized and annealed steel sheet was subjected to secondary recrystallization in a dry nitrogen atmosphere, purification annealing (final annealing) was performed at 1,200° C. in the BAF atmosphere shown in Table 1, and thereby a finally annealed grain-oriented silicon steel sheet was obtained.

These finally annealed steel sheets were subjected to the powder removal pickling treatment under various conditions shown in Table 1. Then, the steel sheet after pickling was annealed by baking. The conditions for annealing by baking were as follows. A tension-insulation coating composed of aluminum phosphate and colloidal silica was applied at 5 $g/m^2$ per one side. Then, the sheet was held in an annealing atmosphere containing 75% of hydrogen and 25% of nitrogen and having a dew point of 30° C. at a temperature of 850° C. for 30 seconds, and baked.

According to the above procedure, various grain-oriented electrical steel sheets including an underlying steel sheet and a tension-insulation coating arranged on the surface of the underlying steel sheet were obtained. For these, the magnetic domain was controlled by laser emission, and the following evaluations were performed.

(1) Evaluation of Magnetic Characteristics

The magnetic characteristics were evaluated according to B8 defined in JIS C 2553: 2012 (a material-specific magnetic flux density at a magnetic field strength of 800 A/m) and W17/50 (watt value per kilogram (W/kg) with a frequency of 50 Hz and a maximum magnetic flux density of 1.7 T).

In this example, it was determined that the grain-oriented electrical steel sheet having B8 of 1.93 T or more and W17/50 of 0.70 W/kg or less had excellent magnetic characteristics.

However, since this pass/fail criterion varied depending on components such as the sheet thickness and the amount of Si, it was not an absolute reference for the grain-oriented electrical steel sheet according to the present invention. For example, in materials having the same B8, when the sheet thickness was reduced by about 0.025 mm, the iron loss value tended to be improved by about 0.05 W/kg, and when the amount of Si was increased by 0.1%, the iron loss value was further improved by about 0.02 W/kg. That is, the above pass/fail criterion was a threshold value for evaluating the grain-oriented electrical steel sheet according to the present invention, which was a grain-oriented electrical steel sheet having a sheet thickness of 0.23 mm and containing 3.2 mass % of Si.

(2) Measurement of Surface Roughness of Underlying Steel Sheet

The tension-insulation coating on the grain-oriented electrical steel sheet was removed by the following procedure. First, 48% caustic soda (sodium hydroxide aqueous solution, specific gravity of 1.5) and water were mixed at a volume ratio of 6:4 to prepare a 33% caustic soda aqueous solution (sodium hydroxide aqueous solution). The temperature of the 33% caustic soda aqueous solution was raised to 85° C. or higher. Then, the grain-oriented electrical steel sheet with a tension-insulation coating was immersed in the caustic soda aqueous solution for 20 minutes. Then, the grain-oriented electrical steel sheet was washed with water and dried to remove the tension-insulation coating on the grain-oriented electrical steel sheet.

Next, according to JIS B 0660: 1998, the ten-point average roughness RzL and the arithmetic average roughness RaL in the L direction (rolling direction in the underlying steel sheet) and the ten-point average roughness RzC and the arithmetic average roughness RaC in the C direction (direction perpendicular to the rolling direction of the underlying steel sheet) were measured.

Here, the surface roughness of the underlying steel sheet (base sheet) immediately before the tension-insulation coating was formed was measured. As a result, it was confirmed that the surface roughness of the underlying steel sheet after the tension-insulation coating was removed from the grain-oriented electrical steel sheet and the surface roughness of the base sheet before the tension-insulation coating was formed were substantially the same.

These evaluation results are shown in Table 1.

TABLE 1

| Base sheet | Annealing separator Amount of MgO added per 100 g of $Al_2O_3$ (g) | BAF atmosphere Partial pressure of $N_2$ in mixed gas containing $N_2$-$H_2$ (%) | Acid (concentration) | Pickling temperature (° C.) | Pickling time (sec) | Rz(L) (μm) | Rz(C) (μm) | Ra(L) (μm) | Ra(C) (μm) | Rz(L)/Rz(C) | B8(T) | W17/50 (W/kg) | Invention |
|---|---|---|---|---|---|---|---|---|---|---|---|---|---|
| A0 | 0 | 25 | 1% $H_2SO_4$ | 20 | 10 | 7 | 2.9 | 0.3 | 0.30 | 2.41 | 1.953 | 0.730 | Comparative example |
| A1 | 20 | 25 | 1% $H_2SO_4$ | 20 | 10 | 3.9 | 3.5 | 0.21 | 0.31 | 1.11 | 1.947 | 0.670 | Present invention example |
| A2 | 40 | 25 | 1% $H_2SO_4$ | 20 | 10 | 4.2 | 6.1 | 0.21 | 0.36 | 0.69 | 1.946 | 0.648 | Present invention example |
| A3 | 40 | 50 | 1% $H_2SO_4$ | 20 | 10 | 2.5 | 3.3 | 0.21 | 0.32 | 0.76 | 1.945 | 0.658 | Present invention example |
| A4 | 40 | 100 | 1% $H_2SO_4$ | 20 | 10 | 1.9 | 3.0 | 0.17 | 0.31 | 0.63 | 1.943 | 0.643 | Present invention example |
| A5 | 60 | 100 | 1% $H_2SO_4$ | 20 | 10 | 5.2 | 7.2 | 0.19 | 0.33 | 0.72 | 1.932 | 0.688 | Present invention example |
| A6 | 60 | 25 | 1% $H_2SO_4$ | 20 | 10 | 6.3 | 8.5 | 0.22 | 0.38 | 0.74 | 1.925 | 0.714 | Comparative example |

All of the grain-oriented electrical steel sheets including the underlying steel sheet having RzL within the range of the present invention exhibited favorable magnetic characteristics.

On the other hand, in the grain-oriented electrical steel sheet in which the RzL was beyond the range of the present invention because the production method did not satisfy production conditions of the present invention, the magnetic characteristics were impaired. Specifically, the grain-oriented electrical steel sheets produced from base sheets A0 and A6 did not satisfy RzL≤6.0, and the magnetic characteristics were impaired.

It was considered that the reason why the surface roughness of the underlying steel sheet of the grain-oriented electrical steel sheet produced from the base sheet A0 was not preferably controlled was that the amount of magnesia in the annealing separator was too small. It was considered that the reason why the surface roughness of the underlying steel sheet of the grain-oriented electrical steel sheet produced from the base sheet A6 was not preferably controlled was that the amount of magnesia in the annealing separator was too large. However, in A5 in which the amount of magnesia in the annealing separator was the same as that of A6, when the partial pressure of nitrogen in the BAF atmosphere was lowered, it was possible to control the surface roughness of the underlying steel sheet.

Example 2

A grain-oriented electrical steel sheet was prepared according to the same procedure as in Example 1 under production conditions in which the pickling time was changed as shown in Table 2. Here, production conditions not shown in Table 2 were the same as those of the base sheet A4 in Table 1. These evaluation results are shown in Table 2.

All of the grain-oriented electrical steel sheets including the underlying steel sheet having RzL within the range of the present invention exhibited favorable magnetic characteristics.

On the other hand, in the grain-oriented electrical steel sheet in which the surface roughness in the L direction was beyond the range of the present invention because the production conditions of the present invention were not satisfied, the magnetic characteristics were impaired. Specifically, in the grain-oriented electrical steel sheet in which the pickling time was 120 seconds, since RzL≤6.0 did not satisfy, the magnetic characteristics were impaired. This is estimated to be due to the pickling time being too long.

Example 3

A grain-oriented electrical steel sheet was prepared according to the same procedure as in Example 1 under production conditions in which the pickling temperature and the acid concentration were variously changed as shown in Table 3. Here, the production conditions not shown in Table 3 were the same as those of the base sheet A3 in Table 1. These evaluation results are shown in Table 3.

TABLE 2

| Base sheet | Acid (concentration) | Pickling temperature (° C.) | Pickling time (sec) | Rz(L) (μm) | Rz(C) (μm) | Ra(L) (μm) | Ra(C) (μm) | Rz(L)/Rz(C) | B8(T) | W17/50 (W/kg) | Invention |
|---|---|---|---|---|---|---|---|---|---|---|---|
| A4 | 1% $H_2SO_4$ | 20 | 10 | 1.9 | 3 | 0.17 | 0.31 | 0.63 | 1.943 | 0.643 | Present invention example |
| A4 | 0.3% $H_2SO_4$ | 80 | 15 | 1.6 | 3 | 0.14 | 0.32 | 0.53 | 1.945 | 0.631 | Present invention example |
| A4 | 0.3% $H_2SO_4$ | 80 | 30 | 1.8 | 2.9 | 0.15 | 0.28 | 0.62 | 1.943 | 0.638 | Present invention example |
| A4 | 0.3% $H_2SO_4$ | 80 | 45 | 2.5 | 2.8 | 0.14 | 0.27 | 0.89 | 1.94 | 0.652 | Present invention example |
| A4 | 0.3% $H_2SO_4$ | 80 | 60 | 3.2 | 3.4 | 0.26 | 0.27 | 0.94 | 1.938 | 0.668 | Present invention example |
| A4 | 0.3% $H_2SO_4$ | 80 | 90 | 5.5 | 5.6 | 0.33 | 0.35 | 0.98 | 1.930 | 0.691 | Present invention example |
| A4 | 0.3% $H_2SO_4$ | 80 | 120 | 7 | 6.5 | 0.33 | 0.35 | 1.08 | 1.920 | 0.721 | Comparative example |

TABLE 3

| Base sheet | Acid (concentration) | Pickling temperature (° C.) | Pickling time (sec) | Rz(L) (μm) | Rz(C) (μm) | Ra(L) (μm) | Ra(C) (μm) | Rz(L)/Rz(C) | B8(T) | W17/50 (W/kg) | Invention |
|---|---|---|---|---|---|---|---|---|---|---|---|
| A3 | 1% $H_2SO_4$ | 20 | 10 | 2.5 | 3.3 | 0.21 | 0.32 | 0.76 | 1.945 | 0.658 | Present invention example |
| A3 | 1% $H_2SO_4$ | 50 | 10 | 2.3 | 3.2 | 0.2 | 0.31 | 0.72 | 1.946 | 0.648 | Present invention example |
| A3 | 1% $H_2SO_4$ | 80 | 10 | 2 | 2.9 | 0.18 | 0.33 | 0.69 | 1.945 | 0.642 | Present invention example |
| A3 | 1% $H_2SO_4$ | 90 | 10 | 1.8 | 3.1 | 0.19 | 0.32 | 0.58 | 1.94 | 0.637 | Present invention example |
| A3 | 0.3% $H_2SO_4$ | 80 | 30 | 1.7 | 3.1 | 0.16 | 0.27 | 0.55 | 1.944 | 0.632 | Present invention example |
| A3 | 0.6% $H_2SO_4$ | 80 | 30 | 1.8 | 3.2 | 0.17 | 0.26 | 0.56 | 1.940 | 0.633 | Present invention example |
| A3 | 1% $H_2SO_4$ | 80 | 30 | 1.9 | 3.2 | 0.17 | 0.27 | 0.59 | 1.938 | 0.635 | Present invention example |
| A3 | 1.5% $H_2SO_4$ | 80 | 30 | 2.0 | 3.3 | 0.16 | 0.26 | 0.61 | 1.935 | 0.644 | Present invention example |
| A3 | 3.0% $H_2SO_4$ | 80 | 30 | 2.5 | 3.5 | 0.19 | 0.28 | 0.71 | 1.935 | 0.672 | Present invention example |
| A3 | 0.3% $H_2SO_4$ | 90 | 30 | 1.9 | 3.3 | 0.15 | 0.29 | 0.58 | 1.942 | 0.642 | Present invention example |
| A3 | 0.6% $H_2SO_4$ | 90 | 30 | 2.1 | 3.5 | 0.15 | 0.30 | 0.60 | 1.938 | 0.653 | Present invention example |
| A3 | 1.0% $H_2SO_4$ | 90 | 30 | 2.5 | 4.1 | 0.18 | 0.31 | 0.61 | 1.935 | 0.681 | Present invention example |
| A3 | 1.5% $H_2SO_4$ | 90 | 30 | 3.1 | 4.9 | 0.21 | 0.35 | 0.63 | 1.930 | 0.691 | Present invention example |
| A3 | 3.0% $H_2SO_4$ | 90 | 30 | 6.5 | 6.0 | 0.25 | 0.41 | 1.08 | 1.925 | 0.721 | Comparative example |

All of the grain-oriented electrical steel sheets including the underlying steel sheet having RzL within the range of the present invention exhibited favorable magnetic characteristics.

On the other hand, in the grain-oriented electrical steel sheet in which the RzL was beyond the range of the present invention because the production conditions of the present invention were not satisfied, the magnetic characteristics were impaired. Specifically, when the temperature of the pickling solution was as high as 90° C., since the influence of the acid concentration became significant, if pickling was performed using 3% $H_2SO_4$, the RzL exceeded 6.0 μm.

INDUSTRIAL APPLICABILITY

According to the present invention, it is possible to provide a grain-oriented electrical steel sheet having excellent magnetic characteristics and a base sheet as a material thereof. Therefore, the present invention has tremendous industrial applicability.

The invention claimed is:

1. A grain-oriented electrical steel sheet comprising an underlying steel sheet and a tension-insulation coating arranged on a surface of the underlying steel sheet, wherein the underlying steel sheet obtained by removing the tension-insulation coating from the grain-oriented electrical steel sheet with an alkaline solution has a ten-point average roughness RzL in a rolling direction of 6.0 μm or less and an arithmetic average roughness RaC in the direction perpendicular to the rolling direction is less than 0.6 μm.

2. The grain-oriented electrical steel sheet according to claim 1, wherein the underlying steel sheet obtained by removing the tension-insulation coating from the grain-oriented electrical steel sheet with an alkaline solution has a ten-point average roughness RzC in a direction perpendicular to the rolling direction of 8.0 μm or less.

3. The grain-oriented electrical steel sheet according to claim 2, wherein the ten-point average roughness RzL in the rolling direction and the ten-point average roughness RzC in the direction perpendicular to the rolling direction satisfy RzL/RzC<1.0.

4. The grain-oriented electrical steel sheet according to claim 1, wherein an arithmetic average roughness RaL in the rolling direction is less than 0.4 μm.

5. A steel sheet serving as a base sheet of the grain-oriented electrical steel sheet according to claim 1, wherein a ten-point average roughness RzL in the rolling direction is 6.0 μm or less and an arithmetic average roughness RaC in the direction perpendicular to the rolling direction is less than 0.6 μm.

6. The steel sheet according to claim 5, wherein a ten-point average roughness RzC in the direction perpendicular to the rolling direction is 8.0 μm or less.

7. The steel sheet according to claim 6, wherein the ten-point average roughness RzL in the rolling direction and the ten-point average roughness RzC in the direction perpendicular to the rolling direction satisfy RzL/RzC<1.0.

8. The steel sheet according to claim 5, wherein an arithmetic average roughness RaL in the rolling direction is less than 0.4 μm.

9. The grain-oriented electrical steel sheet according to claim 2, wherein an arithmetic average roughness RaL in the rolling direction is less than 0.4 μm.

10. The grain-oriented electrical steel sheet according to claim 2, wherein an arithmetic average roughness RaC in the direction perpendicular to the rolling direction is less than 0.6 μm.

11. The steel sheet according to claim 6, wherein an arithmetic average roughness RaL in the rolling direction is less than 0.4 μm.

12. The steel sheet according to claim 6, wherein an arithmetic average roughness RaC in the direction perpendicular to the rolling direction is less than 0.6 μm.

13. The grain-oriented electrical steel sheet according to claim 1, wherein the tension-insulation coating is a non-magnetic substance.

14. The grain-oriented electrical steel sheet according to claim 2, wherein the ten-point average roughness RzL in the rolling direction and the ten-point average roughness RzC in the direction perpendicular to the rolling direction satisfy RzL/RzC<0.7.

15. The grain-oriented electrical steel sheet according to claim 1, wherein the underlying steel sheet obtained by removing the tension-insulation coating from the grain-oriented electrical steel sheet with an alkaline solution has a ten-point average roughness RzL in a rolling direction of 1.6 μm to 6.0 μm.

* * * * *